US012759803B2

(12) United States Patent
Kiyokawa

(10) Patent No.: US 12,759,803 B2
(45) Date of Patent: Oct. 13, 2026

(54) TRANSPORT FACILITY

(71) Applicant: Daifuku Co., Ltd., Osaka (JP)

(72) Inventor: Wataru Kiyokawa, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 32 days.

(21) Appl. No.: 19/055,747

(22) Filed: Feb. 18, 2025

(65) Prior Publication Data

US 2025/0263247 A1 Aug. 21, 2025

(30) Foreign Application Priority Data

Feb. 19, 2024 (JP) ................................ 2024-023106

(51) Int. Cl.

*B65G 43/02* (2006.01)
*B65G 1/04* (2006.01)
*B65G 1/137* (2006.01)
*B65G 43/08* (2006.01)

(52) U.S. Cl.

CPC ........... *B65G 43/02* (2013.01); *B65G 1/0492* (2013.01); *B65G 1/1373* (2013.01); *B65G 43/08* (2013.01); *B65G 2203/0275* (2013.01); *B65G 2203/042* (2013.01)

(58) Field of Classification Search

CPC .... B65G 1/1373; B65G 1/0492; B65G 43/02; B65G 43/08; B65G 2203/0275; B65G 2203/042

See application file for complete search history.

(56) References Cited

U.S. PATENT DOCUMENTS

| | | | | |
|---|---|---|---|---|
| 10,850,923 | B2 * | 12/2020 | Adachi | B65G 1/04 |
| 2021/0032031 | A1 * | 2/2021 | Kalouche | B65G 1/0464 |
| 2021/0253372 | A1 * | 8/2021 | Kieslinger | B65G 54/02 |
| 2021/0362957 | A1 * | 11/2021 | Hagiwara | B61B 3/02 |
| 2024/0410745 | A1 * | 12/2024 | Ogawa | B61K 9/00 |

FOREIGN PATENT DOCUMENTS

| | | | |
|---|---|---|---|
| JP | 2000298511 | A | 10/2000 |
| JP | 2004226482 | A | 8/2004 |
| JP | 6492474 | B2 | 4/2019 |
| JP | 202076750 | A | 5/2020 |
| JP | 202396337 | A | 7/2023 |
| JP | 7318589 | B2 | 8/2023 |

* cited by examiner

*Primary Examiner* — James R Bidwell
(74) *Attorney, Agent, or Firm* — The Webb Law Firm

(57) ABSTRACT

A transport facility includes a plurality of transporters and a determination system. The determination system includes a vibration detector, a recorder, a determiner, and a controller. The vibration detector detects vibrations from each of the plurality of transporters and obtains vibration data indicating the vibrations. The recorder stores at least reference data for determination of a state of each of the plurality of transporters. The determiner determines a sign of an abnormality in each of the plurality of transporters based on the reference data stored in the recorder and the vibration data obtained by the vibration detector. The controller implements an inspection mode of stopping operations of the plurality of transporters other than a target transporter and obtaining, with the vibration detector, the vibration data of the target transporter in operation.

6 Claims, 5 Drawing Sheets

TRANSPORT FACILITY

CROSS-REFERENCE TO RELATED APPLICATION

This application claims priority to Japanese Patent Application No. 2024-023106 filed Feb. 19, 2024, the disclosure of which is hereby incorporated by reference in its entirety.

BACKGROUND OF THE INVENTION

Field of the Invention

The present invention relates to a transport facility.

Description of Related Art

For example, Japanese Unexamined Patent Application Publication No. 2020-76750 (JP 2020-76750) describes a technique for a transport facility. Reference signs in parentheses used hereafter in describing the background are the reference signs in JP 2020-76750.

A transport facility (an automated multistory warehouse 1) described in JP 2020-76750 includes shelves (10) for storing articles (70) and multiple transporters. The multiple transporters include buffer conveyors (60) arranged adjacent to the shelves (10), stacker cranes (30) that transport the articles (70) between the buffer conveyors (60) and compartments in the shelves (10), and lifters (50). Each lifter (50) raises and lowers an article (70) to transfer the article (70) to one of the buffer conveyors (60). Each lifter (50) includes multiple vibration sensors (2). The vibration sensors (2) each detect vibrations from components included in the drive system of the lifter (50).

The above transport facility is trained in advance on the relationship between the amount of frequency fluctuation in each of the multiple components included in the drive system of the lifter (50) and the degree of deterioration of the component, and sets a threshold for the amount of frequency fluctuation based on the trained model. The transport facility transmits an email indication to a terminal device used by an operator of the transport facility when the amount of frequency fluctuation in a component exceeds the threshold. This allows detection of an abnormality in, for example, a component before the lifter (50) fails.

In the transport facility described in JP 2020-76750, vibrations generated from the components included in the drive system of the lifter (50) are measured in a normal operating state (in which the multiple transporters transport the articles). The measurement results may be susceptible to vibrations transmitted from the transporters other than the lifter (50). Thus, a sign of an abnormality may not be determined appropriately for the lifter (50) that is the measurement target transporter when the vibrations from the transporters other than the lifter (50) are larger.

SUMMARY OF THE INVENTION

In view of the foregoing, techniques are thus awaited for appropriately determining a sign of an abnormality in a transporter in a transport facility including multiple transporters.

A transport facility according to an aspect of the disclosure includes a plurality of transporters that transport articles and a determination system that determines a state of each of the plurality of transporters. The determination system includes a vibration detector that detects vibrations from each of the plurality of transporters and obtains vibration data indicating the vibrations, a recorder that stores the vibration data obtained by the vibration detector, a determiner that determines the state of each of the plurality of transporters based on the vibration data, and a controller. The recorder stores at least reference data for determination of the state of each of the plurality of transporters. The determiner determines a sign of an abnormality in each of the plurality of transporters based on the reference data stored in the recorder and the vibration data obtained by the vibration detector. The controller implements an inspection mode of stopping operations of the plurality of transporters other than a target transporter selected among the plurality of transporters and obtaining, with the vibration detector, the vibration data of the target transporter in operation.

This structure allows the transport facility including the plurality of transporters to determine any sign of an abnormality in each of the transporters based on the vibration data indicating vibrations from each of the transporters and the reference data stored in the recorder.

In this structure, the inspection mode is implemented to stop the operations of the transporters other than the target transporter, allowing the vibration data of the target transporter to be obtained while reducing the effects of vibrations from the other transporters. Thus, the accuracy of the vibration data can be improved easily, and the accuracy of determining any sign of an abnormality in each of the transporters can also be improved easily.

Further aspects and advantages of the transport facility will be apparent from exemplary and nonlimiting embodiments described below with reference to the drawings.

DESCRIPTION OF THE INVENTION

First Embodiment

A transport facility 100 according to a first embodiment will be described below with reference to the drawings.

Figure 1:
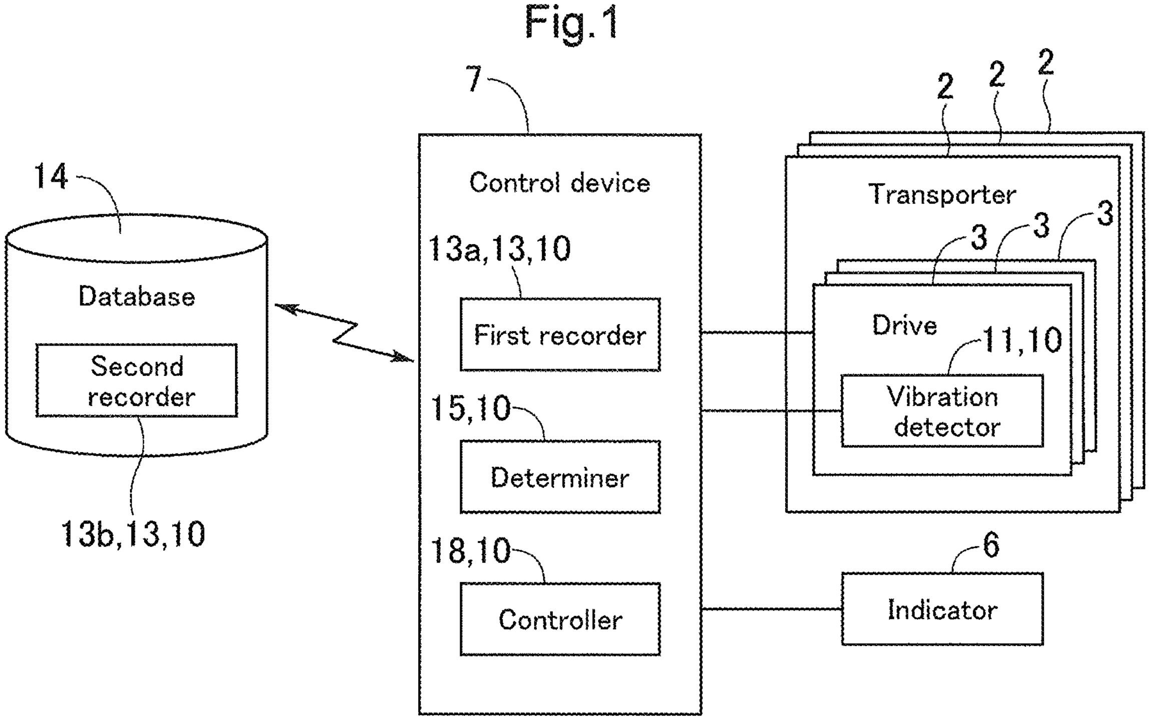
FIG. 1 is a control block diagram.
Figure 2:
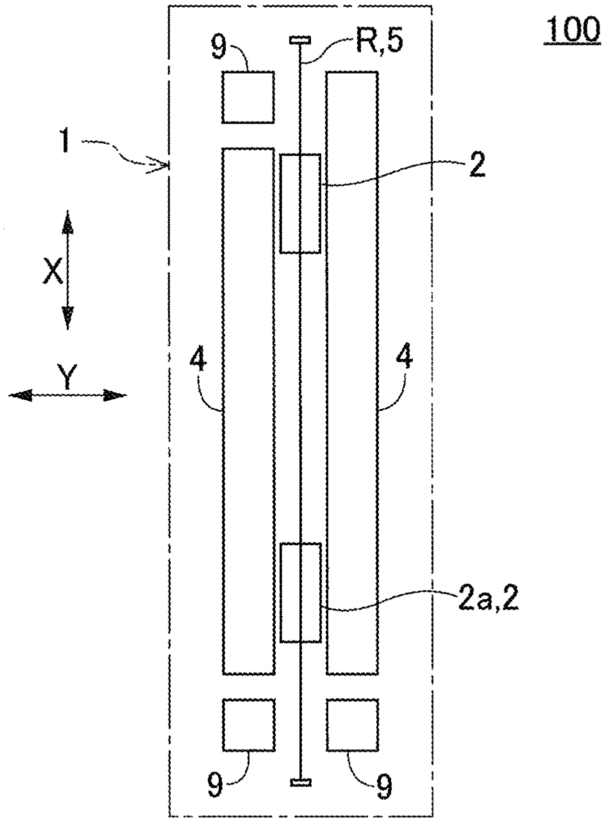
FIG. 2 is a plan view of an example transport facility.
Figure 3:
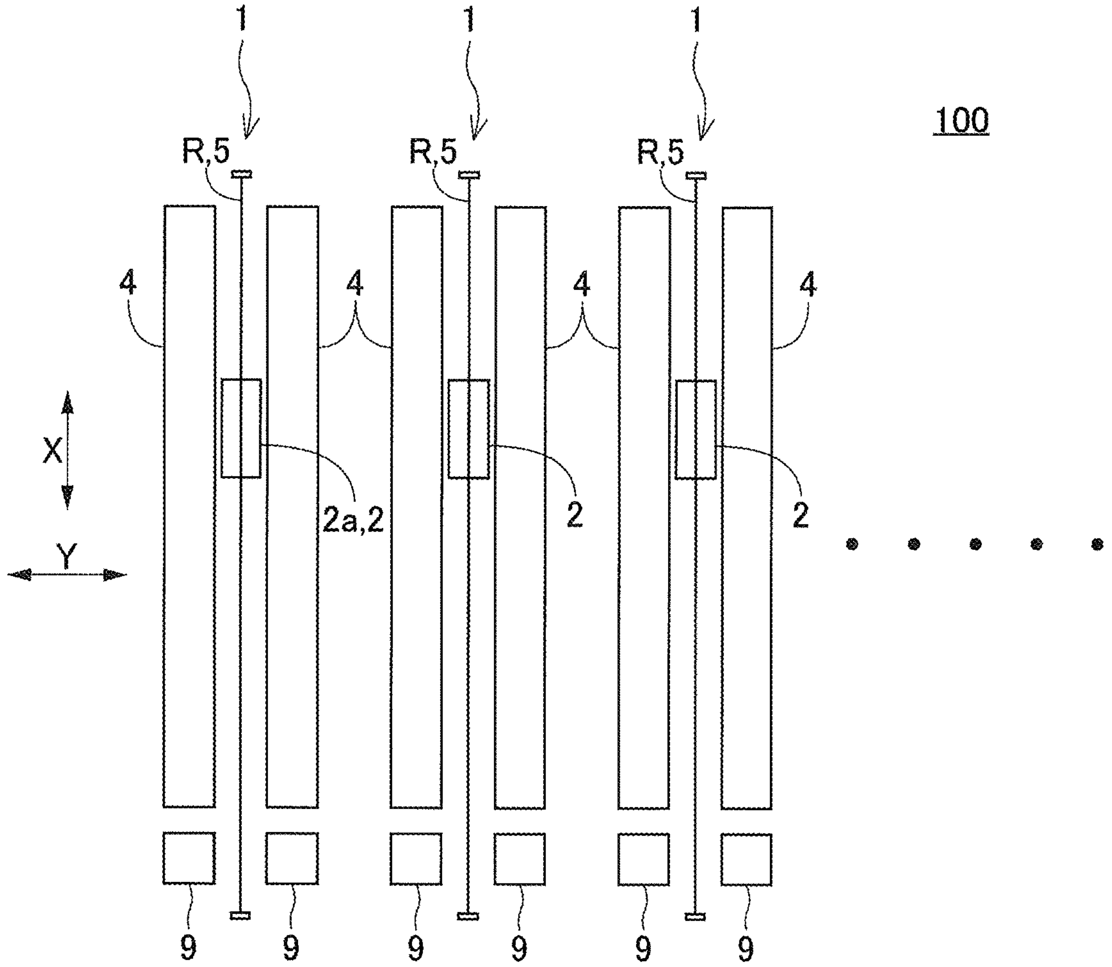
FIG. 3 is a plan view of an example transport facility.

As shown in FIG. 1, the transport facility 100 includes multiple transporters 2 for transporting articles W, and a determination system 10 that determines the state of each of the multiple transporters 2. The transport facility 100 further includes an indicator 6 and a control device 7. In the present embodiment, as shown in FIGS. 2 and 3, the transport facility 100 includes storage shelves 4 that can accommodate the multiple articles W and load-unload ports 9. The multiple transporters 2 transport the articles W between the storage shelves 4 and the load-unload ports 9. In the illustrated examples, the transport facility 100 includes the transporters 2, the storage shelves 4, and the load-unload ports 9. The transporters 2, the storage shelves 4, and the load-unload ports 9 are collectively referred to as a warehouse 1. Each transporter 2 moves along a travel path 5 in the warehouse 1. A pair of storage shelves 4 are arranged across the travel path 5. Each transporter 2 moves as guided by a rail R extending along the travel path 5, and place or remove the articles W into or from the pair of storage shelves 4. The direction parallel to the travel path 5 is hereafter referred to as a first direction X. The direction perpendicular to the first direction X as viewed in the vertical direction (the direction in which the pair of storage shelves 4 are arranged) is hereafter referred to as a second direction Y.

The storage shelves 4 are arranged along the travel path 5. Each storage shelve 4 includes multiple compartments (not shown) for accommodating the articles W. The multiple compartments are arranged in the first direction X and in the vertical direction. Each transporter 2 transfers and receives the articles W to and from the multiple compartments. Each transporter 2 transfers and receives the articles W to and from the multiple load-unload ports 9 adjacent to the storage shelves 4 in the first direction X. Each load-unload port 9 may be a mount on which the articles W are placeable, or a conveyor for loading and unloading the articles W.

Figure 4:
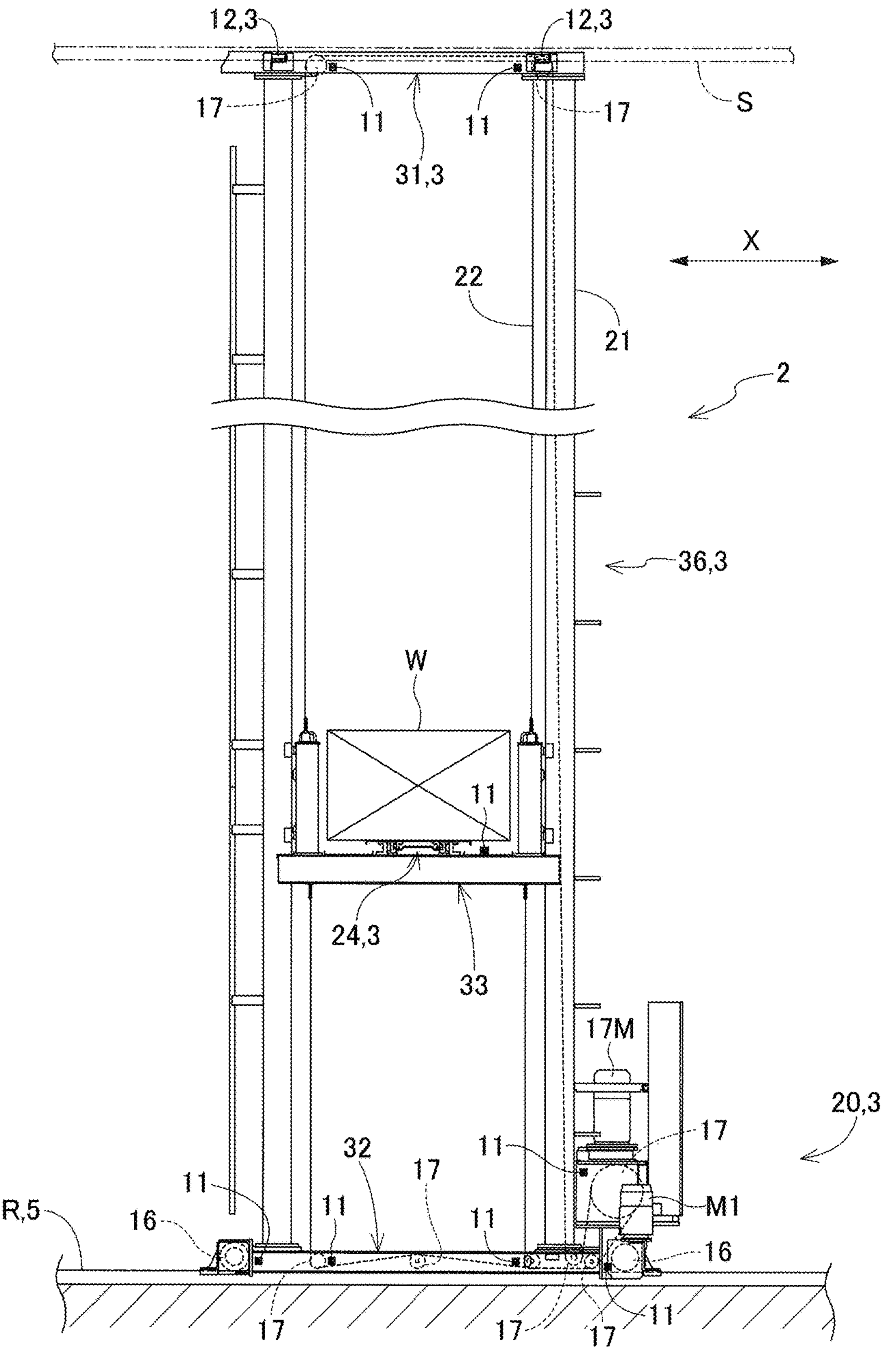
FIG. 4 is a side view of a transporter.

In the present embodiment, as shown in FIGS. 1 and 4, each transporter 2 includes multiple drives 3. The transporter 2 includes, as the multiple drives 3, a traveler 20 that travels as guided by the rail R, a lifter 36 that raises and lowers the articles W, and a transferrer 24. Each of the multiple drives 3 includes, for example, a drive source included in the transporter and an assembly drivable by the drive source as its components. In the present embodiment, the transporter 2 is a stacker crane.

The traveler 20 includes multiple wheels 16 that roll on the rail R, a lower frame 32 supporting the wheels 16, and a travel wheel drive M1 (e.g., a travel motor) that drives at least one of the wheels 16. The lifter 36 includes masts 21 (a pair of masts 21 in this example) standing upright from the lower frame 32, a lift mount 33 that is raised or lowered as guided by the masts 21, a chain 22 supporting the lift mount 33, multiple sprockets 17, and a lift motor 17M that drives at least one of the sprockets 17 to rotate. In the illustrated example, the lift motor 17M is disposed on the lower frame 32 of the traveler 20. The multiple sprockets 17 are arranged on the lower frame 32 and the upper frame 31. The upper frame 31 connects upper portions of the pair of masts 21 arranged separately in the first direction X. In the illustrated example, an upper rail S extends along the upper frame 31. The upper frame 31 includes multiple guide wheels 12 that roll on the upper rail S. The upper frame 31 is movable in the first direction X as guided by the upper rail S. The chain 22 extends in directions in which the lower frame 32, the pair of masts 21, and the upper frame 31 extend and is wound around each of the multiple sprockets 17. The chain 22 suspends the lift mount 33. The lift motor 17M is driven to rotate the sprockets 17 and move the chain 22. This causes the lift mount 33 to move vertically. The components of a drive 3 herein include, for example, members (e.g., the upper frame 31 and the guide wheels 12 in this example) that move in response to a drive source (e.g., the travel wheel drive M1) in another drive 3 (e.g., the traveler 20) being driven. The transferrer 24 includes a transfer assembly and a transfer drive that drives the transfer assembly (e.g., a motor for advancing and retracting). In this example, the transfer assembly uses a fork on which an article W is placeable to advance and retract the article W in the second direction Y.

In the example in FIG. 2, the multiple (two in this example) transporters 2 are arranged on a single common rail R. In the example in FIG. 3, multiple warehouses 1 are arranged in the second direction Y. A single transporter 2 is disposed in each warehouse 1. In other words, in the example in FIG. 3, a single transporter 2 is disposed on each rail R. Multiple sets of the transporter 2 and the rail R are arranged in the second direction Y.

As shown in FIG. 1, the determination system 10 includes vibration detectors 11 that detect vibrations generated from each of the multiple transporters 2 and obtains vibration data indicating the vibrations, a recorder 13 that stores the vibration data obtained by the vibration detectors 11, a determiner 15 that determines the state of each of the transporters 2 based on the vibration data, and a controller 18. In the present embodiment, the recorder 13, the determiner 15, and the controller 18 are included in the control device 7. Some functions of the recorder 13 are implemented with an external database 14 that can communicate with the control device 7. Each of the control device 7 and the database 14 includes a processor such as a microcomputer, and peripheral circuitry including a memory. The hardware and programs executed on a processor such as a computer cooperate with each other to perform the functions.

In the present embodiment, the determination system 10 includes the multiple vibration detectors 11. The vibration detectors 11 are attached to each of the multiple drives 3. The vibration detectors 11 detect vibrations generated from the drives 3. In the present embodiment, the vibration detectors 11 can detect vibrations generated in the components of the multiple drives 3. The vibrations detected by each vibration detector 11 are obtained as the vibration data. The vibration data is transmitted from each vibration detector 11 to the control device 7. In the present embodiment, the multiple vibration detectors 11 are attached to the multiple drives 3 (the traveler 20, the lifter 36, and the transferrer 24) in each transporter 2. In the example in FIG. 4, each of the lower frame 32 and the upper frame 31 includes multiple vibration detectors 11. The lift mount 33 includes a vibration detector 11. More specifically, the vibration detectors 11 are attached to portions adjacent to, for example, the wheels 16 (components of the traveler 20), the multiple sprockets 17 (or the lifter 36), and the guide wheels 12 in the upper frame 31. Although not shown, the vibration detectors 11 are also attached to portions adjacent to the travel wheel drive M1 and the lift motor 17M. The vibration detectors 11 may be attached to portions adjacent to, for example, fasteners fastening and connecting the masts 21 and the lower frame 32 (or the upper frame 31) to each other, in addition to the above portions. As described above, the vibration detectors 11 may be attached to any portions as appropriate.

In the present embodiment, the vibration data includes at least one of data about sound that is vibrations transmitted through air or data about mechanical vibrations that are vibrations transmitted through structures including the transporters 2. In this example, the vibration detectors 11 are sound sensors (measurement microphones). The vibration data is thus the data about sound that is vibrations transmitted through air. The vibrations detected by each vibration detector 11 are obtained as data indicating the relationship between amplitude (sound pressure) and time. The above obtained data is then transformed using Fourier transform into vibration data (e.g., waveform data) indicating the relationship between sound pressure and frequency. The obtained vibration data undergoes a correction process as appropriate. For example, the control device 7 may cut noise when the vibration data includes a waveform with a predetermined noise, or correct the baseline when the baseline is disturbed. The control device 7 can also calculate, for example, the average sound pressure during a predetermined period (a period in which fluctuations in sound pressure and frequency stabilize) based on the waveform data indicating the relationship between sound pressure and frequency. The vibration data may also include, for example, a numerical value obtained through such computation. The frequency obtained as the vibration data is not limited to a frequency in the frequency range audible to humans, and may be a frequency outside the frequency range audible to humans.

The recorder 13 at least stores reference data for determining the state of each of the multiple transporters 2. In the present embodiment, the reference data includes abnormality data indicating the relationship between a past abnormality that has occurred in the transporters for each type of transporter 2 and the vibration data. In the present embodiment, the reference data further includes reference vibration data indicating the vibration data of each of the multiple transporters 2 in a reference state. In this example, the recorder 13 includes a first recorder 13*a* and a second recorder 13*b*. The first recorder 13*a* is included in the control device 7. The second recorder 13*b* is included in the database 14. The first recorder 13*a* stores the reference vibration data. The second recorder 13*b* stores the abnormality data. The reference vibration data may be stored in the second recorder 13*b*.

The reference vibration data is the vibration data of each of the multiple drives 3 in a reference state. The reference vibration data may be data indicating design vibrations or the vibration data obtained by the vibration detectors 11 in the reference state (e.g., the vibration data obtained in an inspection mode described later). The reference state refers to a normal state in which each drive 3 operates normally. The reference vibration data may be, for example, the vibration data of each drive 3 in an initial state (a state at the start of first use) or the vibration data of each drive 3 in the normal state after a predetermined period of use. The reference vibration data may be, for example, the waveform data indicating the relationship between sound pressure and frequency. The reference vibration data may be, for example, data obtained by calculating the average sound pressure during the predetermined period (the period in which fluctuations in sound pressure and frequency stabilize) based on the waveform data indicating the relationship between sound pressure and frequency. The abnormality data includes the vibration data of each of the multiple drives 3 accumulated in the past. More specifically, the abnormality data associates, for example, the vibration data indicating a past abnormality (or a past sign of an abnormality) in the drive 3 of the same type, the details of the past abnormality (or the past sign of an abnormality) including estimated causes of the abnormality, and the operational state (e.g., transitions in operation) of the drive 3.

In this example, the recorder 13 stores the reference vibration data and the abnormality data of the components (e.g., the wheels 16 and the travel wheel drive M1) of the traveler 20. The recorder 13 also stores the reference vibration data and the abnormality data of the components (e.g., the multiple sprockets 17, the chain 22, and the lift mount 33) of the lifter 36. The recorder 13 also stores the reference vibration data and the abnormality data of the components (e.g., the transfer assembly and the transfer drive) of the transferrer 24. Additionally, for example, the recorder 13 stores the reference vibration data and the abnormality data of the guide wheels 12. The database 14 is accessible from, for example, a device other than the control device 7 in the transport facility 100. The database 14 may communicate with, for example, a device for managing various transporters 2 used in a wide region (e.g., a region across multiple countries). The second recorder 13*b* stores the abnormality data obtained from multiple transporters 2 of the same types as the transporters 2 in the present embodiment used in a wide region (e.g., a region across multiple countries). In this example, the second recorder 13*b* also stores the abnormality data of transporters other than the transporters 2 in the present embodiment.

The first recorder 13*a* in the control device 7 prestores, for example, numerical data items that are indices of the signs of abnormalities in each drive 3 in the transporters 2, in addition to the reference vibration data. For example, the first recorder 13*a* stores specific values (decibels) of predetermined frequencies and predetermined sound pressures indicating the signs of abnormalities in a component (e.g., the wheels 16) of the drives 3. In the present embodiment, the signs of abnormalities refer to the states of any of the drives 3 with a relatively high likelihood of an abnormality. The signs of abnormalities may indicate the states of any of the drives 3 with a minor abnormality.

The determiner 15 determines any sign of an abnormality in each of the transporters 2 based on the reference data stored in the recorder 13 and the vibration data obtained by the vibration detectors 11. In the present embodiment, the determiner 15 performs the determination based on the reference vibration data included in the reference data and the vibration data obtained by the vibration detectors 11. In this example, the control device 7 performs a determination process. In the determination process, the determiner 15 determines any sign of an abnormality in each of the multiple drives 3. For example, the determiner 15 may perform the determination for the vibration data obtained from each drive 3 in real time. For example, the determiner 15 may perform the determination for the vibration data obtained from each drive 3 at predetermined intervals. In this example, the control device 7 performs the determination process upon receiving the vibration data from the vibration detectors 11. The determiner 15 refers to the first recorder 13*a* and obtains the reference vibration data corresponding to the received vibration data. More specifically, the determiner 15 obtains, from the first recorder 13*a*, the reference vibration data of the components of the drives 3 (e.g., the wheels 16 in the traveler 20) to which the vibration detectors 11 that have obtained the vibration data are attached. The determiner 15 then compares the vibration data obtained by the vibration detectors 11 with the reference vibration data. The determiner 15 determines a sign of an abnormality in the vibration data obtained by the vibration detectors 11 when, for example, the sound pressure value at a predetermined frequency is greater than or equal to a threshold set for the sound pressure value at the predetermined frequency in the reference vibration data. The determiner 15 may determine any sign of an abnormality in each drive 3 using the vibration data other than the reference vibration data stored in the first recorder 13*a*. When detecting a sign of an abnormality based on the reference vibration data, the determiner 15 outputs, as indication information, the operational state of the drive 3 that has been determined to have a sign of an abnormality and other information (hereafter, this may be simply referred to as output control).

In the present embodiment, the determiner 15 performs the determination based on the abnormality data included in the reference data and the vibration data obtained by the vibration detectors 11. In the determination process, the determiner 15 obtains the abnormality data from the second recorder 13*b* and determines any sign of an abnormality in each drive 3. Upon receiving the vibration data obtained from the vibration detectors 11, the control device 7 transmits the received vibration data to the database 14. The vibration data transmitted from the control device 7 to the database 14 includes the data indicating the relationship between sound pressure and frequency (e.g., the waveform data) and information about the components of the drive 3 (e.g., the wheels 16 in the traveler 20) associated with the data. These information items are stored into the second recorder 13*b*. The determiner 15 can refer to the second recorder 13*b* in the database 14. The determiner 15 then obtains, from the second recorder 13*b*, the abnormality data corresponding to the vibration data obtained from the vibration detectors 11. More specifically, the determiner 15 extracts and obtains one or more pieces of the abnormality data from the second recorder 13*b* based on the vibration data obtained from the vibration detectors 11. When, for example, extracting the abnormality data including the waveform data similar to the waveform data (the example vibration data indicating the relationship between sound pressure and frequency) obtained from the vibration detectors 11, the determiner 15 determines a sign of an abnormality in the drive 3 associated with the obtained vibration data. The determiner 15 then performs the output control to output, as the indication information, information such as the operational state of the drive 3 (the components of the drive 3 in this example), the details of an expected abnormality, and the details of maintenance to be performed, based on, for example, the details of the abnormality (or the sign of an abnormality) and the operational state (e.g., transitions in operation) of the drive 3 included in the abnormality data. For example, for the wheel 16 disposed frontward in the travel direction of the traveler 20, the rotational state of the wheel 16 and the wear state of the tire of the wheel 16 are output. The indication information also includes information indicating, for example, that the wheel 16 may have a failure based on the wear state and the tire is to be replaced. For example, the operational states of each sprocket 17 in the lifter 36 on the upper frame 31 and the orientation of a member fastening the sprocket 17 to the upper frame 31. The indication information also includes information indicating, for example, that the sprocket 17 and the adjacent portions may have a failure based on the state of the member and that the member is to be replaced. The above determination using the abnormality data may not be performed by the determiner 15 included in the control device 7. For example, another determiner 15 may be included in the database 14 or in an arithmetic unit connected to the database 14 and may perform the above determination using the abnormality data.

In the present embodiment, as described above, the transport facility 100 includes the indicator 6 (FIG. 1). The determiner 15 transmits the indication information to the indicator 6. In the present embodiment, the indicator 6 outputs an indication based on the received indication information. The indicator 6 may be an external terminal (e.g., a tablet, or a personal computer or PC) used by a manager managing the transport facility 100. In this case, the indication information is displayed on a display (e.g., a monitor) of the external terminal. The indicator 6 may output the indication information using, for example, light or sound. In this example, the output control is also performed to output the indication information to the indicator 6 when the above determination is performed based on the reference vibration data stored in the first recorder 13*a*. When the above determination is performed based on the reference vibration data stored in the first recorder 13*a*, the indication information includes, for example, the details of the expected abnormality in the drive 3 associated with the vibration data obtained from the vibration detectors 11. The indication information output after the above determination based on the reference vibration data is simpler than the indication information output after the above determination based on the abnormality data. When determining no sign of an abnormality based on the reference vibration data or the abnormality data, the determiner 15 may output such a determination result as the indication information.

In the present embodiment, the abnormality data accumulated in the second recorder 13*b* in the database 14 is updated automatically as appropriate. More specifically, with the vibration data of the transporters 2 of the same type as each transporter 2 accumulated in a wide region (e.g., a region across multiple countries), for example, the details of an abnormality (or a sign of an abnormality; including expected details and causes of the abnormality) associated with the waveform data (e.g., the waveform data indicating the relationship between sound pressure and frequency) and the operational state (e.g., transitions in operation) of the drive 3 associated with the waveform data are updated (corrected) as appropriate. In other words, the database 14 has the learning function. Thus, determination criteria (e.g., criteria for the similarity of waveform data) used by the determiner 15 to determine any sign of an abnormality based on the abnormality data are optimized (updated) as appropriate. The indication information output to the indicator 6 is also optimized as appropriate.

Figure 5:
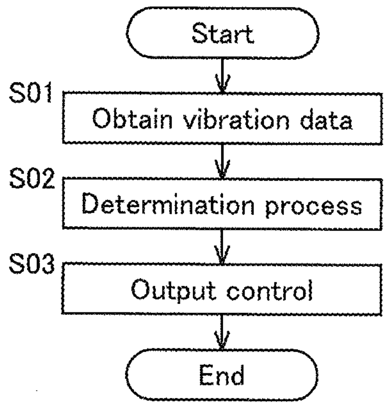
FIG. 5 is a control flowchart.
Figure 6:
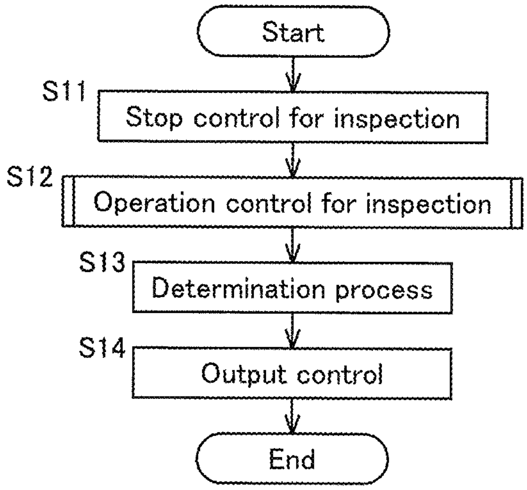
FIG. 6 is a control flowchart.
Figure 7:
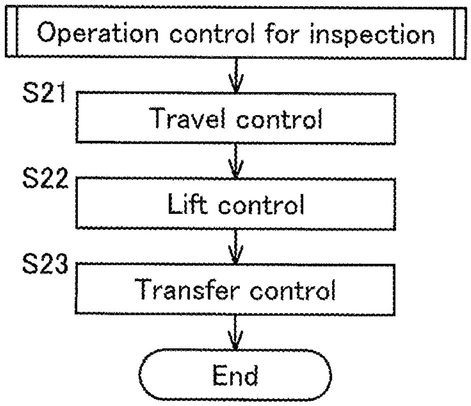
FIG. 7 is a control flowchart.

The controller 18 controls the multiple transporters 2. As shown in FIGS. 5 to 7, the controller 18 implements an inspection mode. The controller 18 implements a normal monitoring mode in addition to the inspection mode. In the normal monitoring mode, the vibration detectors 11 obtain the vibration data while the multiple transporters 2 are transporting the articles W. In the present embodiment, the control device 7 (the controller 18 in this example) obtains the vibration data from the vibration detectors 11 attached to each of the multiple transporters 2 (S01). The control device 7 may obtain the vibration data of the transporters 2 at the same timing or at different timings. The control device 7 may obtain the vibration data from the vibration detectors 11 in real time or in every predetermined cycle. The control device 7 then performs the determination process for each set of the obtained vibration data (S02). The control device 7 (the determiner 15 in this example) then performs the output control (S03).

In the inspection mode, the controller 18 implements the inspection mode of stopping the operations of the transporters 2 other than a single target transporter 2*a* selected among the multiple transporters 2, and obtaining, with the vibration detectors 11, the vibration data of the target transporter 2*a* in operation. In the present embodiment, when the target transporter 2*a* includes the multiple drives 3, the controller 18 in the inspection mode causes the multiple drives 3 to operate sequentially and obtains, with the vibration detectors 11, the vibration data of each of the drives 3 in operation. In the present embodiment, the control device 7 (the controller 18 in this example) performs stop control for inspection and operation control for inspection in the inspection mode. The stop control for inspection stops, among the multiple transporters 2 in operation, the operations of the transporters 2 other than the target transporter 2*a*. In the example in FIG. 2, among the multiple (two in this example) transporters 2 on the single common travel path 5, the transporter 2 other than the target transporter 2*a* stops operating. In the example in FIG. 3, among the multiple transporters 2 on the different travel paths 5, the transporters 2 other than the target transporter 2*a* stop operating. In the example in FIG. 3, not all transporters 2 other than the target transporter 2*a* may stop operating when one or more of the transporters 2 are located relatively distant from the target transporter 2*a* in the second direction Y (e.g., with a distance that allows two warehouses 2 to be arranged). In this case, one or more transporters 2 adjacent to the target transporter 2*a* may alone stop operating. In the present embodiment, as shown in FIG. 6, the control device 7 performs the stop control for inspection in the inspection mode (S11). The control device 7 then performs the operation control for inspection (S12). The control device 7 then performs the determination process (S13). The control device 7 then performs the output control (S14).

In the operation control for inspection, as shown in FIG. 7, the control device 7 (the controller 18 in this example) causes the multiple drives 3 in the target transporter 2*a* to operate sequentially. In the present embodiment, the control device 7 performs travel control for the target transporter 2*a* (S21). The control device 7 then performs lift control (S22). The control device 7 then performs transfer control (S23). More specifically, the controller 18 causes, as the travel control, the traveler 20 to travel with the operations of the lifter 36 and the transferrer 24 being stopped. The controller 18 then stops the traveler 20 and raises and lowers the lifter 36 as the lift control. The controller 18 then stops the lifter 36. The controller 18 then causes, as the transfer control, the transfer assembly in the transferrer 24 to advance or retract. The control device 7 obtains the vibration data of the drive 3 in operation with the vibration detectors 11. The order in which the multiple drives 3 are operated sequentially is changeable as appropriate.

The conditions for the controller 18 to implement the inspection mode may be preset. For example, the controller 18 may automatically implement the inspection mode in a period in which no article W is transported. The controller 18 may implement the inspection mode in response to the manager of the transport facility 100 manually providing (manually inputting) a command for implementing the inspection mode. The controller 18 may preset the order in which the target transporter 2*a* is specified from the multiple transporters 2. The manager of the transport facility 100 may manually specify the target transporter 2*a*. As described above, the inspection mode can be scheduled as appropriate.

Second Embodiment

Figure 8:
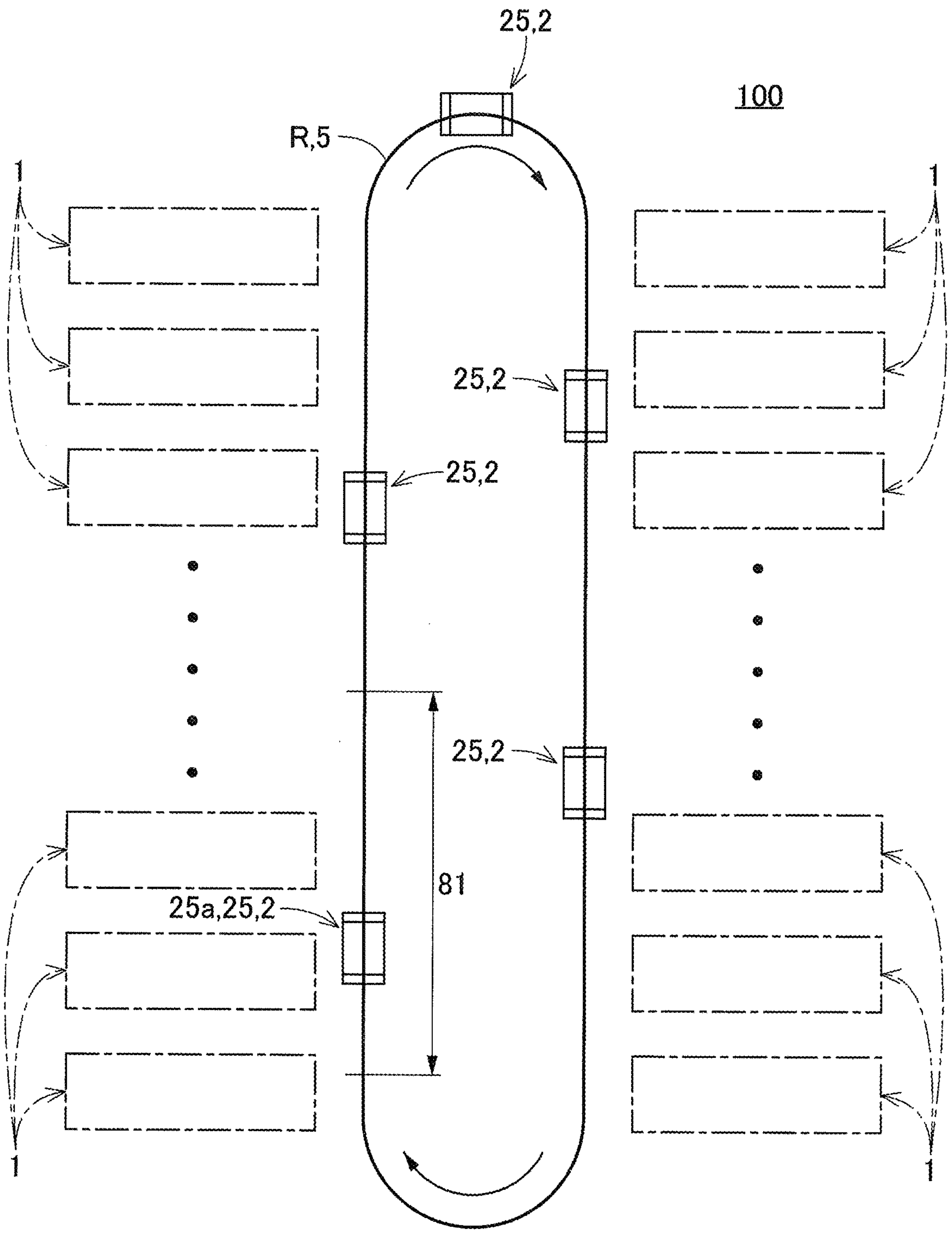
FIG. 8 is a plan view of a transport facility according to another embodiment.

A transport facility 100 according to a second embodiment will be described with reference to FIG. 8. The transport facility 100 according to the present embodiment will be described below focusing on its differences from the transport facility 100 according to the first embodiment. The components not described in the present embodiment are the same as those in the first embodiment, and denoted with the same reference signs and will not be described in detail.

In the present embodiment, the multiple transporters 2 include multiple transport vehicles 25 that travel on the common travel path 5. In this example, as shown in FIG. 8, the multiple transport vehicles 25 that transport the articles W to the multiple warehouses 1 are arranged as the transporters 2. Each transport vehicle 25 is a track-guided transport cart that travels as guided by the rail R along the travel path 5.

In the present embodiment, the controller 18 causes, in the inspection mode, the transport vehicles 25 other than a target transport vehicle 25*a* selected as the target transporter 2*a* among the multiple transport vehicles 25 to move and stop outside an inspection section 81 on the travel path 5, and obtains, with the vibration detector 11, the vibration data of the target transport vehicle 25*a* traveling in the inspection section 81. In this example, the travel path 5 includes straight sections and curved sections. The inspection section 81 is set on a portion of a straight section. The control device 7 (the controller 18 in this example) causes the target transport vehicle 25*a* among the multiple transport vehicles 25 to move to the starting end of the inspection section 81 and causes the other transport vehicles 25 to move outside the inspection section 81. The control device 7 then implements the inspection mode for the target transport vehicle 25*a* with the transport vehicles 25 other than the target transport vehicle 25*a* being stopped in sections other than the inspection section 81. When each transport vehicle 25 includes the multiple drives 3, the operation control for inspection may be performed in the inspection mode. Each transport vehicle 25 may be, for example, a trackless transport cart that travels autonomously on a floor surface, in place of a track-guided transport cart. The inspection section 81 may include a curved section on the travel path 5.

Other Embodiments (1) In the first embodiment described above, each transporter 2 is a stacker crane, but the structure is not limited to this example. The transporter 2 may be a transporter 2 other than a stacker crane. For example, the transporter 2 may be a ceiling-hung transport vehicle that hangs and transports an article W, a transport conveyor on which the article W is placed and transported, a track-guided transport cart that travels along a track, or a trackless transport cart that travel autonomously on a floor surface. The multiple transporters 2 may include a combination of different transporters 2. For example, the multiple transporters 2 may include different types of transporters 2, such as the ceiling-hung transport vehicle, the track-guided transport cart, the trackless transport cart, and the transport conveyor described above. Each transporter 2 may also be, for example, the transferrer 24 for a stacker crane.

(2) In the first embodiment described above, the controller 18 causes the multiple drives 3 to operate sequentially in the inspection mode, but the structure is not limited to this example. The controller 18 may cause the multiple drives 3 to operate at the same time in the inspection mode. The controller 18 may cause some of the multiple drives 3 to operate sequentially and the remaining drives 3 to operate at the same time. In the inspection mode, the transport facility 100 may be divided into multiple areas with one or more transporters 2 arranged in each area. The transporters 2 in each area may undergo the inspection mode at the same time. In this case, for each of the transporters 2 that undergo the inspection mode in the area, the multiple drives 3 may operate sequentially. The size of each divided area may be changed as appropriate based on, for example, the data amount of sets of the reference data obtained by the control device 7 from the database 14 at the same time, or the sizes of the multiple transporters 2 included in the transport facility 100.

(3) In the first embodiment described above, the controller 18 implements the normal monitoring mode in addition to the inspection mode, but the structure is not limited to this example. For example, the controller 18 may simply implement the inspection mode. When the multiple transporters 2 are a combination of different types of transporters 2, the controller 18 may implement, for example, the normal monitoring mode and the inspection mode at the same time for each type of transporter 2.

(4) In the first embodiment described above, the second recorder 13*b* stores the abnormality data indicating the relationship between a past abnormality that has occurred in the transporters 2 for each type of transporter 2 and the vibration data, but the structure is not limited to this example. The abnormality data may be stored in the first recorder 13*a*. The abnormality data may be stored in both the first recorder 13*a* and the second recorder 13*b*. The abnormality data may not be included in the reference vibration data. The reference data may not be included in the reference data.

(5) In the first embodiment described above, the vibration data is the data about sound that is vibrations transmitted through air, but the structure is not limited to this example. The vibration data may be the data about mechanical vibrations that are vibrations transmitted through structures including the transporters 2. In this case, the vibration detectors 11 may be vibration sensors. The vibrations detected by the vibration detectors 11 are transformed using the Fourier transform from the data indicating the relationship between vibration frequency and time into the vibration data indicating the relationship between vibration frequency and frequency. The vibration data may include both the data about sound that is vibrations transmitted through air and the data about mechanical vibrations that are vibrations transmitted through structures including the transporters 2.

(6) In the second embodiment described above, in the inspection mode, the controller 18 causes the transport vehicles 25 other than the target transport vehicle 25*a* to move and stop outside the inspection section 81 set on the travel path 5, and obtains, with the vibration detectors 11, the vibration data with the target transport vehicle 25*a* traveling in the inspection section 81. However, the structure is not limited to this example. The controller 18 may implement the inspection mode to cause the transport vehicles 25 other than the target transport vehicle 25*a* to travel outside the inspection section 81 at a speed lower than the normal speed. In the inspection mode, as described above, the traveling state of the transport vehicles 25 other than the target transport vehicle 25*a* may be changed as appropriate based on, for example, the length of the travel path 5 or the number of transport vehicles 25 traveling on the travel path 5.

(7) The structure described in each of the above embodiments may be combined with any other structures described in the other embodiments (including combinations of the other embodiments) unless any contradiction arises. For other structures as well, the embodiments described herein are merely illustrative in all aspects. Thus, the embodiments described herein may be modified variously as appropriate without departing from the spirit and scope of the disclosure.

OVERVIEW OF EMBODIMENTS

An overview of the transport facility described above is provided below.

A transport facility according to one or more embodiments of the disclosure includes a plurality of transporters that transport articles and a determination system that determines a state of each of the plurality of transporters. The determination system includes a vibration detector that detects vibrations from each of the plurality of transporters and obtains vibration data indicating the vibrations, a recorder that stores the vibration data obtained by the vibration detector, a determiner that determines the state of each of the plurality of transporters based on the vibration data, and a controller. The recorder stores at least reference data for determination of the state of each of the plurality of transporters. The determiner determines a sign of an abnormality in each of the plurality of transporters based on the reference data stored in the recorder and the vibration data obtained by the vibration detector. The controller implements an inspection mode of stopping operations of the plurality of transporters other than a target transporter selected among the plurality of transporters and obtaining, with the vibration detector, the vibration data of the target transporter in operation.

This structure allows the transport facility including the plurality of transporters to determine any sign of an abnormality in each of the transporters based on the vibration data indicating vibrations from each of the transporters and the reference data stored in the recorder.

In this structure, the inspection mode is implemented to stop the operations of the transporters other than the target transporter, allowing the vibration data of the target transporter to be obtained while reducing the effects of vibrations from the other transporters. Thus, the accuracy of the vibration data can be improved easily, and the accuracy of determining any sign of an abnormality in each of the transporters can also be improved easily.

The target transporter may include a plurality of drives. In the inspection mode, the controller may cause the plurality of drives to operate sequentially and may obtain, with the vibration detector, the vibration data of each of the plurality of drives in operation.

In this structure, the plurality of drives in the target transporter operate sequentially in the inspection mode, allowing the vibration data of the target transporter to be obtained while reducing the effects of vibrations from the other transporters. Thus, the accuracy of the vibration data can be improved easily, and the accuracy of determining any sign of an abnormality in each component of the transporters can also be improved easily.

The controller may be configured to implement a normal monitoring mode in addition to the inspection mode. In the normal monitoring mode, the controller may obtain, with the vibration detector, the vibration data of the plurality of transporters transporting the articles.

This structure may lower the determination accuracy than the inspection mode, but can determine any sign of an abnormality in each of the transporters when the plurality of transporters are transporting the articles. Thus, a sign of an abnormality in each of the transporters is likely to be detected early.

The reference data may include abnormality data indicating a relationship between a past abnormality that has occurred in the plurality of transporters for each type of transporter and the vibration data. The determiner may determine the state of the plurality of transporters based on the abnormality data and the vibration data obtained by the vibration detector.

This structure uses the relationship between a past abnormality that has occurred in the plurality of transporters for each type of transporter and the vibration data before or during the abnormality to determine any sign of an abnormality based on the vibration data obtained by the vibration detector. Thus, any sign of an abnormality in each of the transporters can be determined appropriately.

The vibration data may include at least one of data about sound being vibrations transmitted through air or data about mechanical vibrations transmitted through structures including the plurality of transporters.

This structure allows the vibration data indicating the state of each of the transporters to be obtained appropriately as the vibration data based on sound or mechanical vibrations.

The plurality of transporters may include a plurality of transport vehicles that travel on a common travel path. In the inspection mode, the controller may cause the plurality of transport vehicles other than a target transport vehicle selected as the target transporter among the plurality of transport vehicles to move and stop outside an inspection section on the travel path, and may obtain, with the vibration detector, the vibration data of the target transport vehicle traveling in the inspection section.

This structure can obtain the vibration data of the target transport vehicle while reducing effects of the other transport vehicles on the vibration data when the plurality of transport vehicles travel on the common travel path. Thus, the accuracy of the vibration data can be improved easily, and the accuracy of determining any sign of an abnormality in each of the transport vehicles can also be improved easily.

The transport facility according to one or more embodiments of the disclosure produces at least one of the effects described above.

What is claimed is:

1. A transport facility, comprising:

a plurality of transporters configured to transport articles; and a determination system configured to determine a state of each of the plurality of transporters, the determination system comprising:

a vibration detector configured to detect vibrations from each of the plurality of transporters and obtain vibration data indicating the vibrations, a recorder configured to store the vibration data obtained by the vibration detector, a determiner configured to determine the state of each of the plurality of transporters based on the vibration data, and a controller, and wherein:

the recorder stores at least reference data for determination of the state of each of the plurality of transporters, the determiner is configured to determine a sign of an abnormality in each of the plurality of transporters based on the reference data stored in the recorder and the vibration data obtained by the vibration detector, and the controller is configured to implement an inspection mode of stopping operations of the plurality of transporters other than a target transporter selected among the plurality of transporters and obtaining, with the vibration detector, the vibration data of the target transporter in operation.

2. The transport facility according to claim 1, wherein:

the target transporter comprises a plurality of drives, and in the inspection mode, the controller causes the plurality of drives to operate sequentially and obtains, with the vibration detector, the vibration data of each of the plurality of drives in operation.

3. The transport facility according to claim 1, wherein:

the controller is configured to implement a normal monitoring mode in addition to the inspection mode, and in the normal monitoring mode, the controller obtains, with the vibration detector, the vibration data of the plurality of transporters transporting the articles.

4. The transport facility according to claim 1, wherein:

the reference data comprises abnormality data indicating a relationship between a past abnormality that has occurred in the plurality of transporters for each type of transporter and the vibration data, and the determiner determines the state of the plurality of transporters based on the abnormality data and the vibration data obtained by the vibration detector.

5. The transport facility according to claim 1, wherein:

the vibration data comprises at least one of data about sound being vibrations transmitted through air or data about mechanical vibrations transmitted through structures including the plurality of transporters.

6. The transport facility according to claim 1, wherein:

the plurality of transporters comprise a plurality of transport vehicles configured to travel on a common travel path, and in the inspection mode, the controller causes the plurality of transport vehicles other than a target transport vehicle selected as the target transporter among the plurality of transport vehicles to move and stop outside an inspection section on the travel path, and obtains, with the vibration detector, the vibration data of the target transport vehicle traveling in the inspection section.

* * * * *